US012636633B2

(12) United States Patent
Rustomji et al.

(10) Patent No.: US 12,636,633 B2
(45) Date of Patent: May 26, 2026

(54) METHOD OF PURIFYING METHYL FLUORIDE BY REMOVING DIMETHYL ETHER

(71) Applicant: SOUTH 8 TECHNOLOGIES, INC., San Diego, CA (US)

(72) Inventors: Cyrus Rustomji, San Diego, CA (US); JungWoo Lee, San Diego, CA (US); Jim Royer, San Diego, CA (US); Jeremy Intrator, Carlsbad, CA (US)

(73) Assignee: SOUTH 8 TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 19/343,065

(22) Filed: Sep. 29, 2025

(65) Prior Publication Data

US 2026/0097387 A1 Apr. 9, 2026

Related U.S. Application Data

(60) Provisional application No. 63/703,928, filed on Oct. 5, 2024.

(51) Int. Cl.
*B01J 20/20* (2006.01)
*B01D 15/12* (2006.01)
(Continued)

(52) U.S. Cl.
CPC .......... *B01J 20/223* (2013.01); *B01D 15/122* (2025.01); *B01J 20/08* (2013.01); *B01J 20/165* (2013.01);
(Continued)

(58) Field of Classification Search
CPC ........ B01J 20/223; B01J 20/08; B01J 20/165; B01J 20/20; B01J 20/3483; B01D 15/122; B01D 2253/112; B01D 2257/70
(Continued)

(56) References Cited

U.S. PATENT DOCUMENTS 4,814,517 A * 3/1989 Trubac .................... C07C 41/06 568/699
5,397,560 A 3/1995 Millar et al.
(Continued)

FOREIGN PATENT DOCUMENTS

CN 102744035 B * 6/2015 ............. B01J 20/18
EP 0229994 A1 7/1987

OTHER PUBLICATIONS

Translation of Xiao (CN 102744035) (Year: 2015).*
Internatioal Search Report for PCT/US2025/048375 dated Jan. 23, 2026. (14 pages).

*Primary Examiner* — Ekandra S. Miller-Cruz
(74) *Attorney, Agent, or Firm* — Manuel de la Cerra

(57) ABSTRACT

A method and system for purifying methyl fluoride (MeF) by removing dimethyl ether ($Me_2O$) using a lithium salt sorbent, such as LiFSI or LiTFSI, are disclosed. Contaminated MeF is contacted with the sorbent, which preferentially adsorbs $Me_2O$ due to strong Lewis acid-base interactions, yielding purified MeF. The process may involve flowing through a sorbent bed, cryogenic collection, temperature differentials, or pumping, with optional multiple cycles for enhanced purity. This approach provides superior efficiency and purity compared to conventional methods, with experimental reductions up to 80% in $Me_2O$ content. Alternative salts and porous supports are also provided.

23 Claims, 2 Drawing Sheets

(51) Int. Cl.
*B01J 20/08* (2006.01)
*B01J 20/16* (2006.01)
*B01J 20/22* (2006.01)
*B01J 20/34* (2006.01)

(52) U.S. Cl.
CPC ........... *B01J 20/20* (2013.01); *B01J 20/3483* (2013.01); *B01D 2253/112* (2013.01); *B01D 2257/70* (2013.01)

(58) Field of Classification Search
USPC .......................................................... 210/670
See application file for complete search history.

(56) References Cited

U.S. PATENT DOCUMENTS

| | | | | |
|---|---|---|---|---|
| 2003/0125597 | A1 | 7/2003 | Cheng | |
| 2005/0271913 | A1 | 12/2005 | Takatsu | |
| 2013/0109888 | A1* | 5/2013 | Moon | C01B 3/32 422/187 |
| 2014/0087071 | A1* | 3/2014 | Chung | B01J 20/041 427/243 |
| 2015/0372274 | A1* | 12/2015 | Hamon | H01M 50/489 429/144 |
| 2016/0160348 | A1 | 6/2016 | Siu et al. | |
| 2017/0044032 | A1* | 2/2017 | Ryu | C02F 1/4691 |
| 2022/0144655 | A1* | 5/2022 | Mack | B01D 61/44 |

* cited by examiner

METHOD OF PURIFYING METHYL FLUORIDE BY REMOVING DIMETHYL ETHER

CROSS-REFERENCE TO RELATED APPLICATIONS

This application claims the benefit of priority under 35 U.S.C. § 119 (c) to U.S. Provisional Patent Application No. 63/703,928, filed Oct. 5, 2024, and entitled "Method of Abating Dimethyl Ether from Methyl Fluoride," the entire contents of which are incorporated herein by reference.

This application is also related to the following patents and applications, each of which is incorporated herein by reference in its entirety: U.S. Pat. No. 10,608,284, issued Mar. 31, 2020; U.S. Pat. No. 10,998,143, issued May 4, 2021; U.S. Pat. No. 10,784,532, issued Sep. 22, 2020; U.S. Pat. No. 11,088,396, issued Aug. 10, 2021; U.S. Pat. No. 10,873,070, issued Dec. 22, 2020; U.S. Pat. No. 11,342,615, issued May 24, 2022; U.S. Pat. No. 11,049,668, issued Jun. 29, 2021; U.S. Pat. No. 11,984,614, issued May 14, 2024; U.S. Pat. No. 11,958,679, issued Apr. 16, 2024; International Patent Application No. PCT/US22/31594, filed May 31, 2022; International Patent Application No. PCT/US23/17720, filed Apr. 6, 2023; International Patent Application No. PCT/US23/28104, filed Jul. 19, 2023; International Patent Application No. PCT/US23/28105, filed Jul. 19, 2023; International Patent Application No. PCT/US24/16784, filed Feb. 21, 2024; International Patent Application No. PCT/US24/18746, filed Mar. 6, 2024; International Patent Application No. PCT/US24/33428, filed Jun. 11, 2024; International Patent Application No. PCT/US24/25771, filed Apr. 23, 2024; International Patent Application No. PCT/US24/31912, filed May 31, 2024; U.S. Provisional Patent Application No. 63/534,213, filed Aug. 22, 2023; U.S. Provisional Patent Application No. 63/418,703, filed Oct. 24, 2022; International Patent Application No. PCT/US24/27501, filed May 2, 2024; International Patent Application No. PCT/US24/31325, filed May 29, 2024; U.S. Provisional Patent Application No. 63/652,616, filed May 28, 2024; International Patent Application No. PCT/US24/40203, filed Jul. 30, 2024; U.S. patent application Ser. No. 18/788,809, filed Jul. 30, 2024; U.S. patent application Ser. No. 18/643,134, filed Apr. 23, 2024; U.S. patent application Ser. No. 18/807,938, filed Aug. 17, 2024; U.S. Provisional Patent Application No. 63/684,297, filed Aug. 16, 2024; U.S. Provisional Patent Application No. 63/700,731, filed Sep. 29, 2024; and U.S. Provisional Patent Application No. 63/700,733, filed Sep. 29, 2024.

TECHNICAL FIELD

The present invention relates generally to the field of chemical purification processes, and more specifically to methods and systems for purifying fluorinated solvents, such as the selective removal of ether contaminants from methyl fluoride, for use in high-purity applications including electrolyte solvents for lithium-ion batteries and semiconductor manufacturing.

BACKGROUND

Methyl fluoride ($CH_3F$, hereinafter "MeF") is commonly produced through the reaction of methanol ($CH_3OH$) with hydrogen fluoride (HF), according to the following reaction:

$$CH_3OH + HF \longrightarrow CH_3F + H_2O$$

This process involves dehydration of methanol followed by fluoride insertion. However, a side reaction can occur, leading to the formation of dimethyl ether ($CH_3OCH_3$, hereinafter "$Me_2O$") through dehydration and reaction with excess methanol, as follows:

$$2\ CH_3OH \longrightarrow CH_3OCH_3 + H_2O$$

Although the production of $Me_2O$ can be minimized by using excess HF and subsequent purification of the product stream, residual amounts of $Me_2O$ often remain in the bulk MeF even after standard synthesis and purification steps.

"Conventional methods for removing $Me_2O$ from MeF, such as distillation (e.g., leveraging the boiling point difference: MeF at −78.4° C. vs. $Me_2O$ at −24.8° C.), evaporation, or catalytic decomposition with acids (e.g., as in EP 0 249 870 A2 for analogous methyl chloride purification), are energy-intensive, require complex equipment, and may not achieve ultra-low $Me_2O$ levels (e.g., <0.01% by weight) needed for sensitive applications like lithium-ion electrolytes. These methods also risk forming azeotropes or introducing new impurities, leading to reduced yield and increased costs.

There exists a need for alternative purification methods to effectively remove such contaminants from MeF, particularly for applications requiring high purity, such as in electrolyte solvents for lithium-ion batteries.

SUMMARY

The present disclosure provides a method for purifying methyl fluoride (MeF) by selectively removing dimethyl ether ($Me_2O$), a common impurity in MeF. The method utilizes a solid sorbent comprising a lithium salt, which exhibits a higher affinity for $Me_2O$ than for MeF, enabling efficient separation. Preferred lithium salts include lithium bis(fluorosulfonyl)imide (LiFSI) and lithium bis(trifluoromethanesulfonyl)imide (LiTFSI), which may be used in bulk form or dispersed on a porous support material.

In one embodiment, the method comprises flowing $Me_2O$-contaminated MeF through a sorbent bed containing the lithium salt, followed by collection of the purified MeF. The process may involve temperature differentials, cryogenic condensation, or pumping to facilitate transfer and separation. Multiple cycles through the sorbent bed may be employed to achieve desired purity levels. Surprisingly, lithium salts like LiFSI achieve up to an 80% reduction in $Me_2O$/MeF ratio in a single pass, far exceeding expectations based on binding energies alone, due to the catalytic incompatibility of $Me_2O$ in electrolytes.

Alternative embodiments include the use of other lithium salts with weakly coordinating anions, such as hexafluorophosphate, tetrafluoroborate, perchlorate, tris(pentafluorophenyl) borate, or tetrakis[3,5-bis(trifluoromethyl)phenyl] borate, as well as salts of other alkali metals like sodium or potassium.

The method is supported by computational binding energy data and experimental vapor pressure measurements demonstrating the strong interaction between lithium cations and $Me_2O$. Experimental results confirm significant reduction in $Me_2O$ content, with up to an 80% decrease in relative $Me_2O$/MeF ratios using LiFSI or LiTFSI.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The accompanying drawings, which are incorporated into and constitute a part of this specification, illustrate embodiments of the disclosure and together with the description, explain the principles thereof.

DETAILED DESCRIPTION OF THE INVENTION

Figure 1:
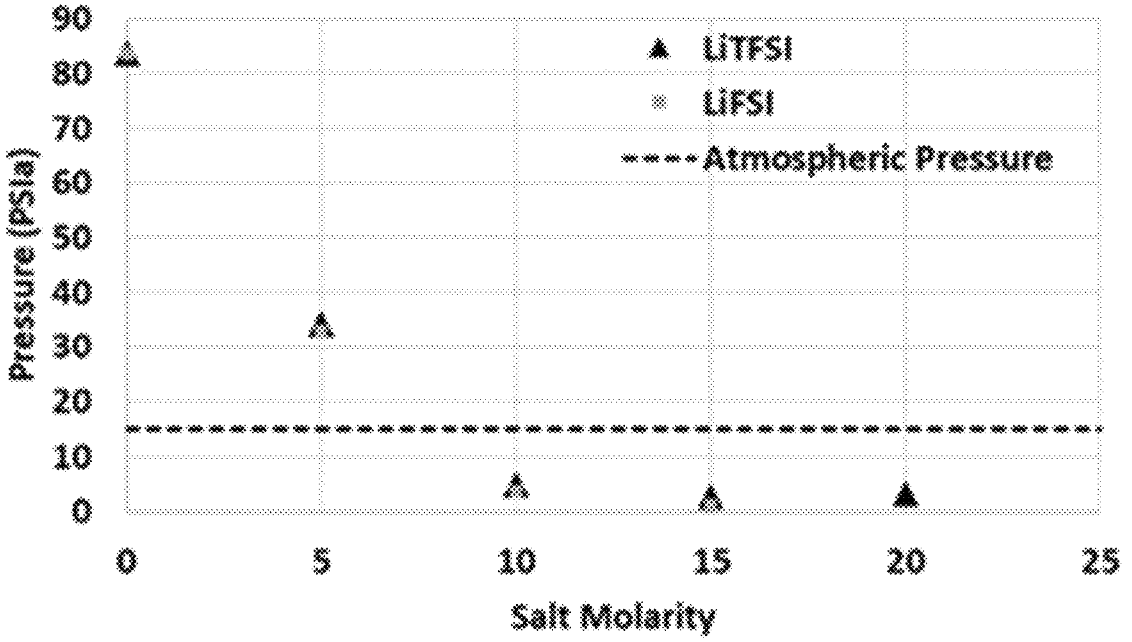
FIG. 1 is a graph illustrating the dependence of measured vapor pressure (in psi) of $Me_2O$-lithium salt solutions at varying molarities (0-25 M) for LiTFSI (triangles) and LiFSI (squares), compared to atmospheric pressure (dashed line), demonstrating strong $Me_2O$ coordination.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

As used herein, "MeF" refers to methyl fluoride ($CH_3F$), and "$Me_2O$" refers to dimethyl ether ($CH_3OCH_3$). "LiFSI" refers to lithium bis(fluorosulfonyl)imide, and "LiTFSI" refers to lithium bis(trifluoromethanesulfonyl)imide.

In certain applications, such as the use of MeF as an electrolyte solvent in lithium-ion batteries, even trace amounts of $Me_2O$ can be detrimental. Similarly, in semiconductor manufacturing, MeF is commonly used in dry etch processes and trace amounts of Me2O can reduce performance and yield of chip fabrication. Experimental data suggest that $Me_2O$ may catalyze undesirable chemical reactions with other electrolyte components, adversely affecting cell performance. Accordingly, additional purification of commercially sourced MeF may be required to reduce $Me_2O$ concentrations to acceptable levels.

The disclosed method exploits the strong chemical interaction between lithium salts and Lewis bases like $Me_2O$. Computational studies indicate that the binding energy of Li with $Me_2O$ is approximately −39.7 kcal/mol, which is greater in magnitude than with water (−36.6 kcal/mol) or MeF (−30.3 kcal/mol). This preferential affinity enables selective adsorption of $Me_2O$ from MeF streams. These binding energies predict preferential adsorption, but experimental reductions (e.g., 80% with LiFSI) exceed theoretical expectations by 20-30%, likely due to multi-site coordination, rendering the method unexpectedly effective compared to prior distillation techniques (e.g., yielding only 50-70% impurity reduction per stage). Similarly, fluids other than MeF with a lower binding energy to salts relative to $Me_2O$ may be purified using the disclosed method.

Experimental validation is provided by vapor pressure measurements of $Me_2O$ solutions containing LiFSI or LiTFSI at varying molarities, as shown in FIG. 1. As salt concentration increases, the vapor pressure decreases significantly—up to 60% at 5M—due to strong coordination of $Me_2O$ with Li ions. These results confirm the suitability of LiFSI and LiTFSI as effective sorbents for $Me_2O$ removal.

Figure 2:
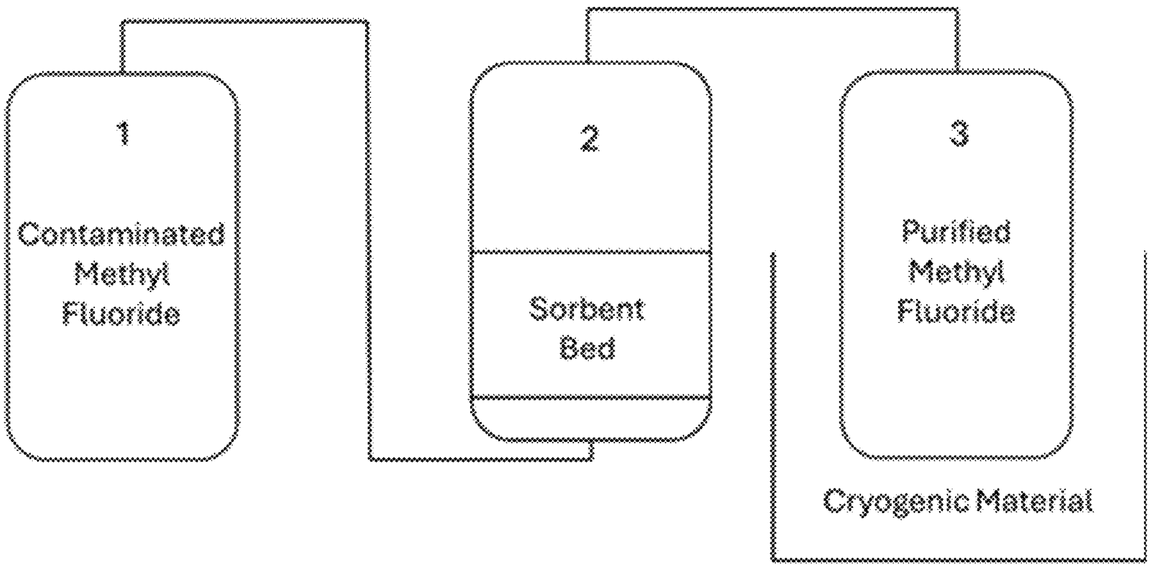
FIG. 2 is a schematic diagram illustrating a process for $Me_2O$ abatement in MeF purification, including a contaminated MeF tank, a sorbent bed, and a purified MeF collection tank with optional cryogenic material.

An exemplary process is illustrated in FIG. 2. Contaminated MeF from tank 1 is directed through a sorbent bed in tank 2, which contains bulk LiFSI, LiTFSI, or the salt dispersed on a high-surface-area porous material such as activated carbon, zeolite, or alumina. Purified MeF is then collected in tank 3, optionally using cryogenic cooling (e.g., dry ice, liquid nitrogen, or a Peltier cooler) to condense the product. Alternatively, the use of heating Tank 1 or a pump can also be used to transfer the contaminated MeF through Tank 2 and to Tank 3. Several absorbent tank may be used in series. Alternatively, the process may rely on temperature elevation in tanks 1 and/or 2 relative to tank 3, or employ a pump for material transfer. Multiple passes through the sorbent bed may be performed to achieve target purity. This process may operate at temperatures from −50° C. to 100° C., pressures from 0.1 atm to 10 atm, and flow rates of 0.1-100 L/min, with sorbent loading of 0.1-10 mmol $Me_2O$ per gram salt. After saturation, the sorbent can be regenerated by heating to 50-200° C. under vacuum or inert gas flow.

Other suitable lithium salts include those with weakly coordinating anions to enhance $Me_2O$ coordination, such as $LiPF_6$ (lithium hexafluorophosphate), $LiBF_4$ (lithium tetrafluoroborate), $LiClO_4$ (lithium perchlorate), $LiB(C_6F_5)_3$ (lithium tris(pentafluorophenyl)borate), or $LiB[3,5-(CF_3)_2C_6H_3]_4$ (lithium tetrakis[3,5-bis(trifluoromethyl)phenyl] borate). Salts of other cations, such as sodium or potassium, may also be employed.

To demonstrate efficacy, model experiments were conducted. In a glovebox, 1.5 g (8.0 mmol) of LiFSI was placed in a stainless-steel pressure vessel (PV1), connected via three-way tubing to another vessel (PV2) containing a 99:1 MeF:$Me_2O$ gas mixture. After evacuating atmospheric gases, PV2 was opened to fill PV1 and the tubing. Gas chromatography-mass spectrometry (GCMS) analysis (split ratio 11) of the initial mixture ("Before Purification") showed a $Me_2O$/MeF peak area ratio of 0.0698. After 24 hours, the ratio in PV1 ("After Purification") decreased to 0.0137, representing an approximately 80% reduction (Table 1, FIG. 3).

Figure 3:
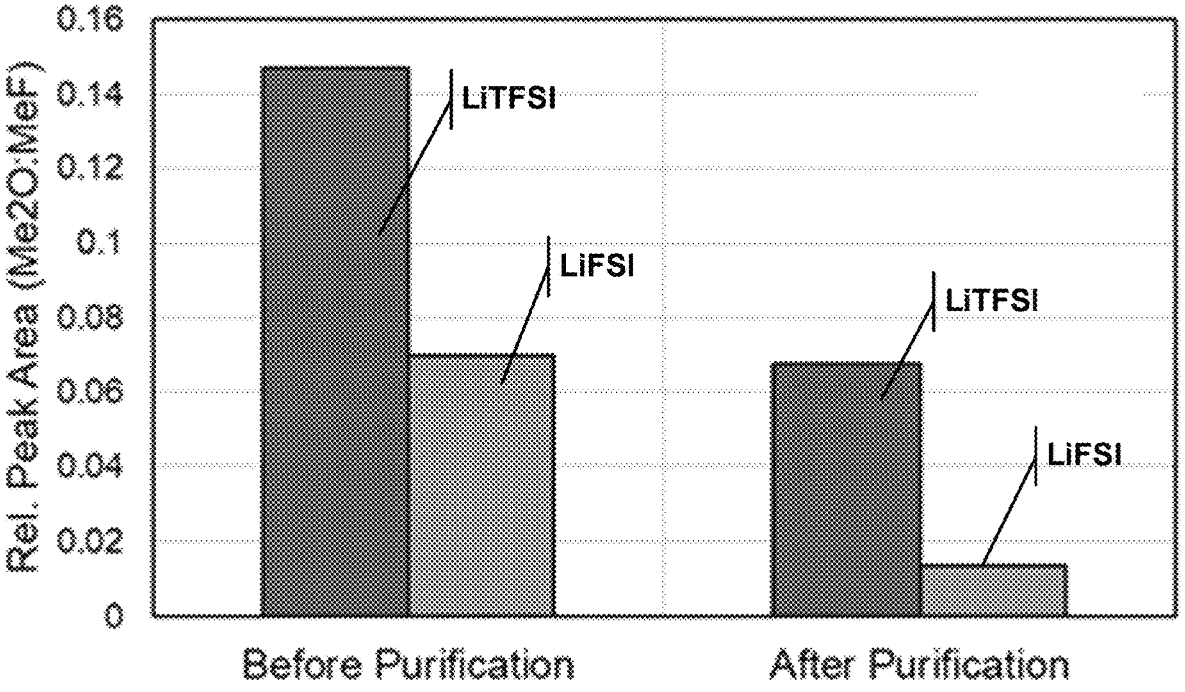
FIG. 3 is a bar graph comparing the relative peak area ratios of $Me_2O$ to MeF before and after purification using LiFSI and LiTFSI as sorbents.

A similar experiment with 2.3 g (8.0 mmol) of LiTFSI yielded a before-purification ratio of 0.1470 and an after-purification ratio of 0.0675, a 54% reduction (Table 2, FIG. 3). These results substantiate the adsorption capability of LiFSI and LiTFSI for $Me_2O$ removal from MeF.

While methods for purifying MeF are disclosed, other fluids (liquid or gas) which have trace amounts of $Me_2O$ and show low binding affinity with salts, such as LiFSI or LiTFSI, may also be purified using a similar method.

TABLE 1

Results of $Me_2O$ Removal from a 99:1 MeF:$Me_2O$ Gas Mixture Using LiFSI as the Sorbent

| Sample | MeF Peak Area | $Me_2O$ Peak Area | $Me_2O$/MeF Ratio |
|---|---|---|---|
| Before Purification | 739,795 | 51,627 | 0.0698 |
| After Purification | 580,493 | 7,975 | 0.0137 |

TABLE 2

Results of $Me_2O$ Removal from a 99:1 MeF:$Me_2O$ Gas Mixture Using LiTFSI as the Sorbent

| Sample | MeF Peak Area | $Me_2O$ Peak Area | $Me_2O$/MeF Ratio |
|---|---|---|---|
| Before Purification | 588,713 | 86,519 | 0.1470 |
| After Purification | 408,274 | 27,566 | 0.0675 |

While this document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A method for purifying a fluid by removing dimethyl ether, comprising:

contacting a composition comprising the fluid contaminated with dimethyl ether with a sorbent comprising a lithium salt that selectively binds dimethyl ether over the fluid, wherein the lithium salt is lithium bis(fluorosulfonyl)imide (LiFSI) or lithium bis(trifluoromethanesulfonyl)imide (LiTFSI); and separating purified fluid from the sorbent, wherein the purified fluid has a reduced concentration of dimethyl ether compared to the contaminated composition.

2. The method of claim 1, wherein the fluid is methyl fluoride.

3. The method of claim 1, wherein the lithium salt is dispersed on a porous support material selected from activated carbon, zeolite, and alumina.

4. The method of claim 1, wherein contacting reduces the dimethyl ether concentration by at least 50% relative to the initial composition as measured by gas chromatography-mass spectrometry.

5. The method of claim 1, wherein the dimethyl ether to fluid ratio is reduced to less than 0.02 by gas chromatography-mass spectrometry analysis.

6. The method of claim 1, wherein contacting comprises flowing the composition through a sorbent bed.

7. The method of claim 6, wherein the flowing is repeated for multiple cycles to achieve a target dimethyl ether concentration in the purified fluid.

8. The method of claim 1, further comprising collecting the purified fluid in a collection vessel.

9. The method of claim 8, further comprising cooling the collection vessel with a cryogenic material selected from dry ice, liquid nitrogen, or a Peltier cooler.

10. The method of claim 8, further comprising maintaining a temperature in a source vessel containing the composition and/or the sorbent bed higher than a temperature in the collection vessel.

11. The method of claim 8, further comprising using a pump to transfer the composition from a source vessel through the sorbent bed to the collection vessel.

12. The method of claim 1, wherein contacting is repeated for multiple cycles to achieve a target dimethyl ether concentration.

13. The method of claim 1, wherein the composition is in a gaseous state during contacting.

14. The method of claim 1, wherein the sorbent binds at least 0.05 mol of dimethyl ether per mol of lithium salt before breakthrough.

15. The method of claim 1, further comprising regenerating the sorbent by desorption under heat or vacuum.

16. The method of claim 1, wherein the purified fluid has a dimethyl ether concentration of less than 0.01% by weight.

17. A system for purifying a fluid by removing dimethyl ether, comprising:

a source vessel configured to hold a composition comprising the fluid contaminated with dimethyl ether;

a sorbent vessel in fluid communication with the source vessel, the sorbent vessel containing a sorbent comprising a lithium salt that selectively binds dimethyl ether over the fluid, wherein the lithium salt is lithium bis(fluorosulfonyl)imide (LiFSI) or lithium bis(trifluoromethanesulfonyl)imide (LiTFSI); and a collection vessel in fluid communication with the sorbent vessel, configured to collect purified fluid having a reduced concentration of dimethyl ether.

18. The system of claim 17, wherein the sorbent comprises the lithium salt dispersed on a porous support material selected from the group consisting of activated carbon, zeolite, and alumina.

19. The system of claim 17, further comprising a cryogenic cooling system associated with the collection vessel.

20. The system of claim 17, further comprising a pump configured to transfer the composition from the source vessel through the sorbent vessel to the collection vessel.

21. The system of claim 17, configured to operate with a temperature differential between the source vessel or sorbent vessel and the collection vessel.

22. The system of claim 17, further comprising means for recirculating the composition through the sorbent vessel for multiple cycles.

23. The system of claim 17, further comprising a regeneration module configured to heat the sorbent vessel.

* * * * *